United States Patent [19]
Giangiulio

[11] 3,971,508
[45] July 27, 1976

[54] OIL CLARIFICATION SYSTEM
[76] Inventor: Clayton Giangiulio, 5 Skyline Drive, Malvern, Pa. 19355
[22] Filed: Feb. 3, 1975
[21] Appl. No.: 546,592

[52] U.S. Cl. .................................. 233/4; 233/11; 233/19 R; 233/32
[51] Int. Cl.² .................................. B04B 11/04
[58] Field of Search ............... 233/23 R, 24, 27, 28, 233/19 R, 19 A, 1 R, 11, 32, 3, 4

[56] References Cited
UNITED STATES PATENTS
| | | | |
|---|---|---|---|
| 1,279,056 | 9/1918 | Weston | 233/32 |
| 2,534,210 | 12/1950 | Schutte et al. | 233/19 R |
| 3,791,576 | 2/1974 | Bazil | 233/23 R |

FOREIGN PATENTS OR APPLICATIONS
| | | | |
|---|---|---|---|
| 238,684 | 11/1945 | Switzerland | 233/27 |

Primary Examiner—George H. Krizmanich
Attorney, Agent, or Firm—Caesar, Rivise, Bernstein & Cohen, Ltd.

[57] ABSTRACT

A wall-mounted oil clarification system for use in clarifying oil in a deep fat fryer disposed below the system. The system comprises a stationary hollow collector having an outlet tube for carrying clarified oil to the deep fat fryer, a hollow rotatable drum disposed within the collector and having a central axis about which the drum rotates. The drum includes an imperforate circular side wall disposed about the axis, a bottom wall and top wall including an opening disposed over the axis. Pump means are provided for carrying the oil to be clarified by the system from the fryer into the drum. Motor means are provided to rotate the drum at a high speed such that the centrifugal force produced by the rotation effects the separation of the higher density particulate matter from the lower density oil, whereupon said oil flows out of the opening in the top wall of the drum and into the collector for return to the deep fat fryer.

8 Claims, 5 Drawing Figures

U.S. Patent  July 27, 1976  3,971,508
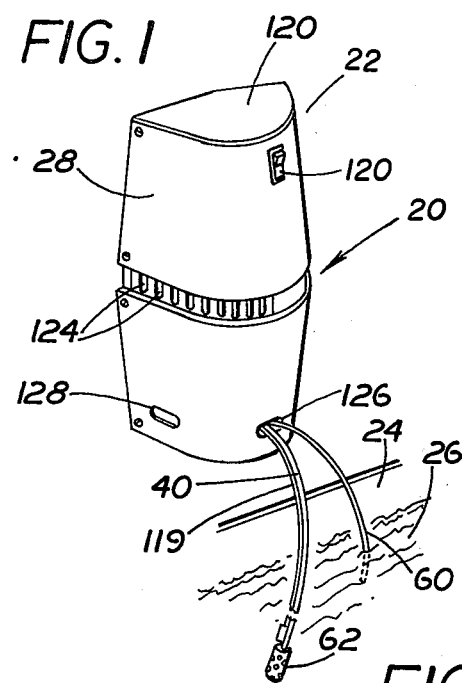
FIG. 1
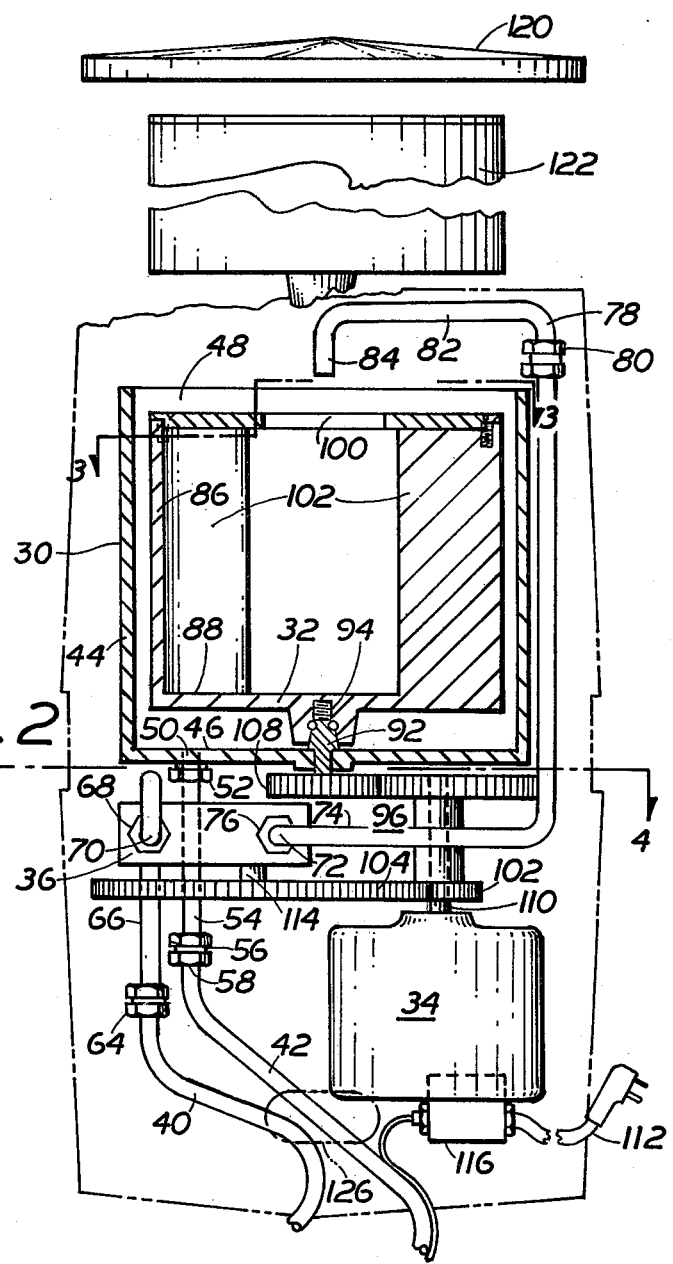
FIG. 2
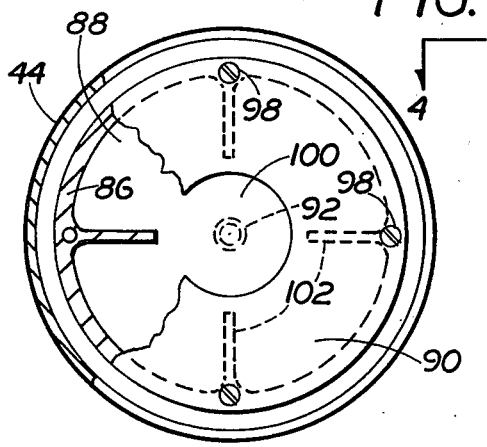
FIG. 3
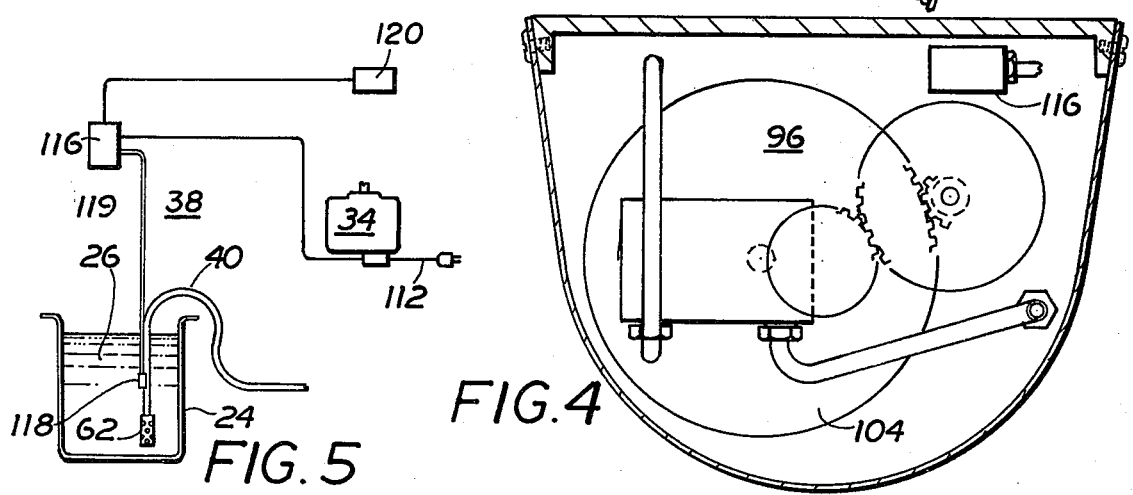
FIG. 5
FIG. 4

OIL CLARIFICATION SYSTEM

This invention relates generally to liquid filtering apparatus and more particularly to oil clarification systems for use with deep fat frying equipment.

As is known, when oil is used in a deep fat fryer to effect the cooking of food immersed therein, small particles of the food being cooked break off and enter the oil. The high temperature of the oil causes the particles to eventually carbonize and also results in the production of rancid acids which results in the rapid deterioration of the oil.

The proliferation of various fast food chains utilizing large numbers of deep fat fryers for long periods of time has created the substantial need for oil clarification systems which enable the oil used in cooking equipment to be reused over a long period of time before replacement.

To that end, various filtering apparatus have been proposed to remove particulate matter in the oil and to sweeten the oil and such apparatus are commercially available. However, such apparatus have not proved as efficient as desired. This is because most prior art filtering apparatus make use of some type of mechanical filtering media, e.g., filter paper, porous membranes, etc., to trap the carbonized particles and impurities in the oil when the oil is passed therethrough. Once such a filtering medium is full of the trapped particles, it must be discarded and a fresh medium replaced therefore. In high production fast food operations this factor necessitates frequent time consuming and expensive filter changes, which changes also may result in the loss of valuable cooking time. In addition, the costs for filtering media, e.g., porous paper filters, is escalating rapidly.

Perhaps the most important drawback with prior art filtering apparatus is that such apparatus, by utilizing mechanical filters for trapping particles in the oil passing therethrough, did not effect the removal of sufficient impurities from the oil to render the oil capable of real long term use. With the price of cooking oils skyrocketing the need for an efficient and expeditious oil clarification system is now almost critical.

In U.S. Pat. No. 3,356,218 (Grudoski) there is disclosed apparatus utilizing centrifugal force to aid in the filtering of the particles from cooking oil. However, such apparatus merely involves the use of centrifugal force in lieu of gravity or pump pressure to carry the oil to be clarified through a mechanical filter medium. In the Grudoski apparatus filter paper is used as the means for trapping the carbonized food particles. Therefore, all of the drawbacks of other prior art filtering techniques which result from the use of filter paper or other mechanical filtering apparatus also exist with the apparatus of the Grudoski patent.

Accordingly, it is a general object of this invention to provide an oil clarification system which overcomes the disadvantages of the prior art.

It is a further object of this invention to provide an oil clarification system utilizing centrifugal force to effect the separation of higher density particulate matter from lower density oil and without the need for filter papers, porous membranes or other mechanical filters.

It is still a further object of this invention to provide an automatic oil clarification system which is operative to effect the clarification of oil in a deep fat fryer whenever the temperature thereof exceeds a predetermined level.

These and other objects of this invention are achieved by providing a system for clarifying oil held in a reservoir in apparatus by extracting higher density particulate matter from the lower density oil. The system comprises a stationary, hollow collector having an outlet for carrying clarified oil to the reservoir and a hollow rotatable drum disposed within the collector and having a central axis about which the drum rotates. The drum includes an imperforate circular side wall disposed about the central axis, a bottom wall and a top wall including an opening disposed over the central axis. Pump means are provided for carrying oil having particulate matter disposed therein from the reservoir into the drum. Motor means are provided for rotating the drum at a high speed, whereupon the centrifugal force produced by the rotation effects the separation of the higher density particulate matter by causing said matter to be thrown radially outward from the central axis, against the imperforate side wall of the drum to be held thereon while the lower density oil flows over the trapped material, out through the central opening in the top wall of the drum and into the collector for return to the reservoir in the apparatus.

Other objects and many of the attendant advantages of this invention will be readily appreciated as the same becomes better understood by reference to the following detailed description when considered in connection with the accompanying drawings wherein:

FIG. 1 is a perspective view of a wall mounted oil clarification system in accordance with this invention for clarifying the oil held within a reservoir in cooking apparatus;

FIG. 2 is a front elevational view, partially in section of a portion of the system shown in FIG. 1;

FIG. 3 is a sectional view taken along line 3—3 of FIG. 2;

FIG. 4 is a sectional view taken along line 4—4 of FIG. 2; and

FIG. 5 is a schematic view of the means for automatically controlling the operation of the system.

Referring now to the various figures of the drawing wherein like reference characters refer to like parts, there is shown in FIG. 1 an improved oil clarification system 20 for effecting the continuous clarification of oil within a reservoir by removing the oil therefrom to trap any particles contained therein and to return the clarified oil to the reservoir.

While the apparatus 20 shown herein is of particular utility for use in clarifying cooking oil used in deep fat frying equipment, it is to be understood that such apparatus can be used in various other oil clarification applications, e.g., clarifying lubricating oil used for motors.

As can be seen in FIG. 1 the apparatus 20 is arranged to be mounted on a wall 22 over an oil reservoir, such as the cooking vat 24 of the deep fat fryer, containing oil 26 to be clarified. The apparatus 20 basically comprises a housing 28 enclosing the operative components of the system. The operative components comprise a collector 30 (FIG. 2), a centrifuge bowl or drum 32 (FIG. 2) disposed within the collector, an electric motor 34 (FIG. 2) to rotate the drum, a pump 36 (FIG. 2) to carry oil to be clarified to the drum and control means 38 (FIG. 5) for controlling operation of the pump and the motor. Suction means in the form of flexible tube 40 is provided to carry oil to be clarified to the pump and return means in the form of another flexible tube 42 is provided to carry clarified oil back to the reservoir.

As can be seen in FIGS. 2 and 3 the collector 30 is a hollow member having a circular side wall 44, a planar bottom wall 46 and an open top 48. The collector serves to receive clarified oil produced by the operation of the system for return to the reservoir 24. To that end, an opening 50 is provided in the bottom wall 46 of the collector 30 and communicates, via a threaded coupling 52, to a conduit 54. The conduit is in turn connected, via another threaded coupling 56 to one end of a flexible return tube 42. The other end 60 of the return tube is disposed below the level of the oil within the reservoir. Accordingly, clarified oil received within the collector (as will be described later) is enabled to flow, via gravity, through opening 50, communicating conduit 52 and communicating return tube 40 back to the reservoir.

Oil is withdrawn from the reservoir for clarification by the system 20 via suction tube 40. To that end, as can be seen tube 40 includes at its free end a perforated tip 62 (FIG. 1) to enable the oil in the reservoir to be drawn into the tube. The other end of the tube 40 is connected, via a threaded coupling 64, to one end of a communicating conduit 66. The other end of the conduit is connected, via another threaded coupling 68, to the input port 70 of the pump 36. The pump 36 also includes an outlet port 72 which communicates with one end of the conduit 74 via a threaded coupling 76. The other end of the conduit 76 is connected to a pivoting tubular arm 78 via a threaded coupling 80. The arm 78 includes an extending portion 82 which terminates in an open, downwardly directed free end 84.

The pump 36 is operative, when energized (as will be described later) for pulling oil through suction tube 40, through conduit 66, into inlet port 68, through the pump mechanism, out through outlet port 76 into conduit 74 and communicating arm 78 and out its open free end 82 to the means for effecting the clarification of the oil.

In accordance with this invention the means for clarifying the oil comprises the rotating centrifuge bowl or drum 32. As will be described in detail hereinafter the drum is arranged to be rotated at a high rotational speed, e.g., 3000 rpm, to create centrifugal force to effect the extraction of higher density particles within the oil from the lower density oil itself and without the need for filter paper or other mechanical filtering media.

To that end, as can be seen in FIGS. 2 and 3 drum 32 comprises an imperforate circular side wall 86, a planar bottom wall 88 formed integrally therewith and a top wall 90. A short drive shaft 92 is threadedly engaged in a threaded recess 94 in the bottom of the drum coaxial with the central axis thereof. The drive shaft 92 is rotated by the motor, via a drive system 96 (FIG. 4) to be described later, to effect the rotation of the drum 32 about its central axis.

The top wall of the drum is secured to the side wall 86 via plural screws 98 and includes the central opening 100 over the central axis of the drum. Four vanes 102 project radially inward from the side wall 86 at equally spaced locations about the periphery of the drum.

As can be seen in FIG. 2 the free end 84 of the arm 78 is arranged to be pivoted over the central opening 100 in the drum 32. Accordingly, oil to be clarified and which is drawn into the system 20 in the manner as described heretofore is enabled to flow downward from the open end 84 of the arm 78 through opening 100 and into the interior of the drum for clarification.

The oil entering the drum is clarified as follows: the rotation of the drum at a high speed creates centrifugal force which acts upon the higher density food particles disposed within the oil. Accordingly, such particles are thrown radially outward and against the inside periphery of the imperforate side wall 86. The continued high speed rotation of the drum holds such particles in place on the imperforate side wall while the lower density oil is enabled to flow upward and out of opening 100 in the top wall of the drum. Since the drum is disposed with the collector 30 the clarified oil exiting opening 100 collects in the collector for return to the reservoir via return line 42 as heretofore described.

When the drum is full of trapped food particles the drum is removed from collector 30 by unscrewing its threaded connection 94 from the threaded end of the drive shaft 92. A clean drum can then be screwed in place and the system restarted with very little down time resulting. The full drum can then be cleaned by unscrewing its top plate to provide access to its interior.

Arm 78 is pivotable horizontally about coupling 80 so as to permit the arm to be swung from the position shown in FIG. 2 wherein its free end is disposed over the opening 100 to a retracted position (not shown) to enable the drum 32 to be readily removed from the collector without interference from the arm.

The drive means 96 is operative for rotating the drive shaft 92 and simultaneously operating the pump 32. To that end, the drive means comprises four tooth gears, a pump drive gear 102, a pump gear 104, a drum drive gear 106 and drum gear 108. As can be seen the pump drive gear 102 and the drum drive gear 106 are each connected to a motor drive shaft 110. The shaft 110 is the output shaft of the motor and rotates at a high speed, e.g., 1500 rpm, upon the energization of the motor from a 110 volt AC power line 112. The energization of the motor is controlled by control means 38 (as will be described later). The drum drive gear 106 is also connected to the motor drive shaft 110. The pump gear 104 is engaged with the pump drive gear 102 and is mounted on pump shaft 114. The shaft 114, when rotated by gear 104, causes the pump to operate to effect the pumping of the oil. The pump gear is of a larger diameter than the pump drive gear to reduce the rotational speed imparted to the pump shaft 114 from the motor 34 to approximately 150 rpm. The drum gear 108 is engaged with the drum drive gear 106 and is connected to drive shaft 92. The drum gear 108 is a smaller diameter than the drum drive gear to increase the rotational speed imparted to the drive shaft 92 by the motor 34 to approximately 3000 rpm.

In accordance with this invention the system 20 is arranged to turn itself on and off automatically whenever the oil in the reservoir is at a sufficiently high temperature conducive to efficient clarification. It has been found that at a temperature of approximately 200°F. vegetable cooking oil is sufficiently thin to be readily clarified. Accordingly, the control means 38 is arranged to start the clarification system 20 operating when the temperature of the cooking oil in the reservoir reaches 200°F. and to turn itself off when the temperature drops below 200°F. To that end, the control means comprise a thermostatic switch 116 and a sensor or bulb 118 coupled to switch 116 via a capillary tube 119 and mounted at the free end of suction tube 40 adjacent its tip 62. The thermostatic switch 116 includes a pair of contacts (not shown) which are connected in the 110 volt line 112 and are adapted, when closed, to enable electrical power to be provided, via line 112, to the motor to cause it to operate, and, when closed, to interrupt the flow of power to the motor to cause it to turn off. A master switch 120 (FIGS. 1 and 5) is provided and is electrically connected to the thermostatic switch 116 to energize the control circuit 38 thereby providing a manual on-off function.

The thermostatic control described heretofore of the conventional type wherein an expandable gas is provided within the bulb 118 and communicates, via the capillary tube 119, with a bellows (not shown) within the thermostatic switch 116. The bellows is in turn connected to the contacts of the switch. Accordingly, when the temperature of the oil in which the bulb is immersed increases to a predetermined point (e.g., 200°F.) the gas within the bulb will have expanded sufficiently to cause the bellows to move the contacts of the switch to their closed position, whereupon the motor is energized. When the temperature of the oil drops below that predetermined point (during the evening when the deep fat fryers are turned off) the gas within the bulb contracts, whereupon the bellows moves the contacts to the open position and the motor turns off.

The housing 28 fully encloses the apparatus 20 and thus aids in retarding oxidation of the oil as it is clarified by the system. A removable cover 122 is provided in the top of the housing to provide access to the drum 32 to facilitate the changing thereof. In FIG. 2 the cover is shown removed from the housing to enable the substitution of clear replacement drum 123 for the drum 32 (assuming that the latter is full of trapped food particles).

Plural ventilation ports 124 are provided within the housing 28 to enable the motor and pump to run cooly.

As can be seen in FIG. 1 the lower portion of the housing includes plural ports, a front port 126, a left side port 128 and an imposed right side (not visible). The ports are provided to enable the suction tube 40 and the return tube 42 to be expeditiously extended to the reservoir, irrespective of the disposition of the reservoir with respect to the wall mounted system 20. For example, if the reservoir is immediately below the system (like that shown in FIG. 1) the tubes 40 and 42 can be extended through the front port 126, whereas if the reservoir is to the right of the system the tubes can be extended through the right side port.

It should thus be appreciated that the oil clarification system of the instant invention is a simple and efficient system and not requiring mechanical filtering media. In addition the system is automatic to enable it to operate continuously all the while that the deep fat fryers with which it is associated are operating and to turn itself off when the temperature of the oil in the vats of those fryers drops below a predetermined level (which action occurs during the time interval when the fryers are turned off).

Without further elaboration, the foregoing will so fully illustrate my invention, that others may, by applying current or future knowledge, readily adapt the same for use under various conditions of service.

What is claimed as the invention is:

1. An automatic system for clarifying cooking oil held in a deep fat fryer apparatus while said oil is hot by extracting higher density food particles from the lower density oil, comprising clarifying means comprising an inlet tube for carrying hot cooking oil having food particles disposed therein from said fryer to said clarifying means, a stationary hollow collector having an outlet tube for carrying clarified oil back to said fryer, a hollow rotatable drum disposed within said collector and having a central axis about which the drum rotates, said drum including an imperforate circular side wall disposed about said axis, a bottom wall and a top wall including an opening disposed about said axis and within said collector, pump means for carrying hot oil having food particles disposed therein from said fryer, through said inlet tube, and into said drum, motor means for rotating said drum at a high speed, and temperature responsive means adapted for immersion within the oil in said fryer and connected to said pump means and said motor means for automatically turning said pump means and said motor means on when the temperature of the oil in said fryer reaches a predetermined level and for automatically turning said pump means and said motor means off when the temperature of said oil drops below said level, whereupon the centrifugal force produced by said rotation effects the separation of said food particles by causing said particles to be thrown radially outward from said central axis against said imperforate side wall to be held thereon while said lower density oil flows over said trapped particles, out through the central opening in the top wall of the drum and into said collector for return to said fryer.

2. The system of claim 1 wherein said temperature responsive means comprises a thermostatic switch.

3. The system of claim 2 wherein said system is disposed within a covered housing, said housing being arranged for wall mounting.

4. The system of claim 3 wherein said rotating drum includes plural partitions extending a substantial distance in the radial direction towards said central axis.

5. The system of claim 3 wherein said outlet tube is flexible, and wherein said inlet tube is flexible and connected to said pump, said inlet tube having a free end disposed within said fryer for carrying oil to be clarified to said pump.

6. The system of claim 2 wherein said thermostatic switch is connected to means for supplying electrical power to said motor in order to turn said motor on whenever the temperature of the oil to be clarified is approximately 220°F. or above.

7. The system of claim 6 wherein the operation of said motor effects the operation of said pump means.

8. The system of claim 7 wherein said system is disposed within a covered housing having a front aperture and a pair of opposed side apertures, said housing means adapted for mounting on a wall, said inlet and outlet tubes extending through a selected one of said openings, depending upon the disposition of said apparatus with respect to said system.

* * * * *